Nov. 13, 1956 A. E. BREWSTER 2,770,674

TAPE RECORDING APPARATUS

Filed Oct. 7, 1953 2 Sheets-Sheet 1

*Inventor*
A.E. BREWSTER
By Robert Harding Jr.
*Attorney*

Nov. 13, 1956 A. E. BREWSTER 2,770,674

TAPE RECORDING APPARATUS

Filed Oct. 7, 1953 2 Sheets-Sheet 2

Inventor
A. E. BREWSTER
By Robert Harding Jr.
Attorney

United States Patent Office 2,770,674

Patented Nov. 13, 1956

2,770,674

TAPE RECORDING APPARATUS

Arthur Edward Brewster, London, England, assignor to International Standard Electric Corporation, New York, N. Y., a corporation of Delaware Application October 7, 1953, Serial No. 384,579

Claims priority, application Great Britain October 9, 1952

4 Claims. (Cl. 178—17)

This invention relates to tape recording apparatus and particularly to the retransmission of information stored in the form of multi element two condition code characters e. g. telegraph type code characters having a start element, a plurality of intelligence elements and a stop element. The code is recorded longitudinally upon the tape and may be recorded on a magnetic tape, or may be in the form of punched holes or by any other suitable method. According to the present invention, there is provided a transmitting apparatus for telegraph type code signals recorded longitudinally upon a tape, comprising a sprocket wheel for driving said tape, a reading head for reading the recorded information, means for transmitting said read information and further means independent of said read information for arresting said sprocket wheel for a predetermined time interval during the passage of a stop element under said read head whereby the time interval of the transmitted stop element may be of any desired length.

Figure 1:
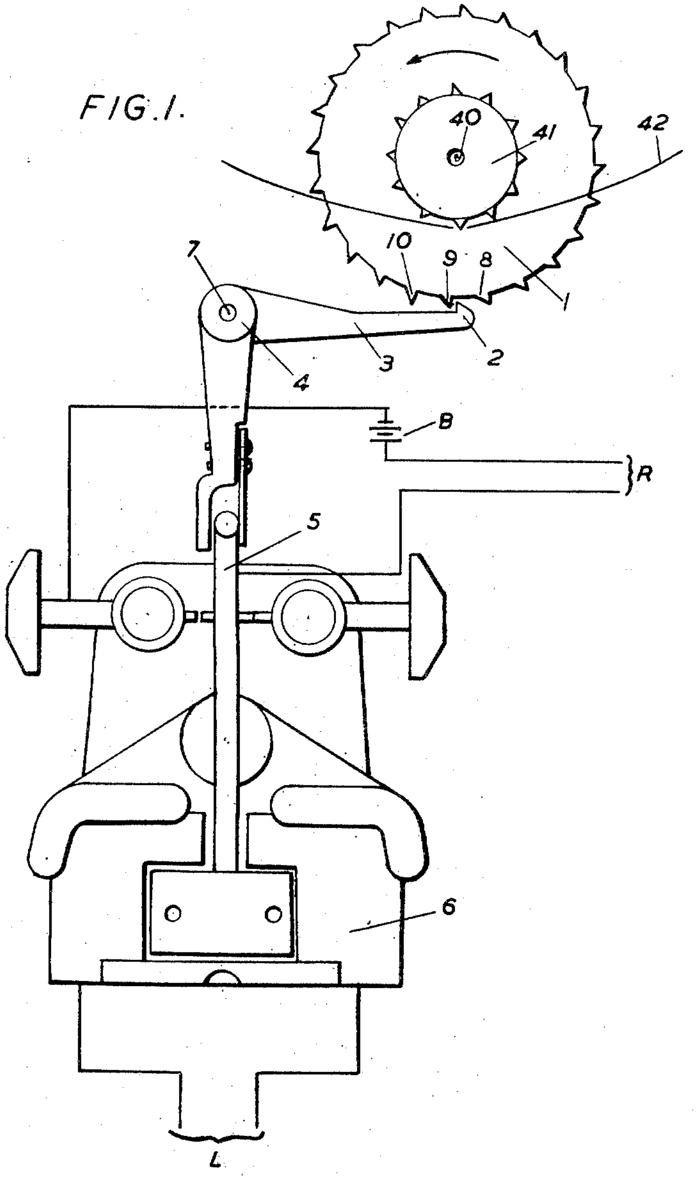
Figure 2:
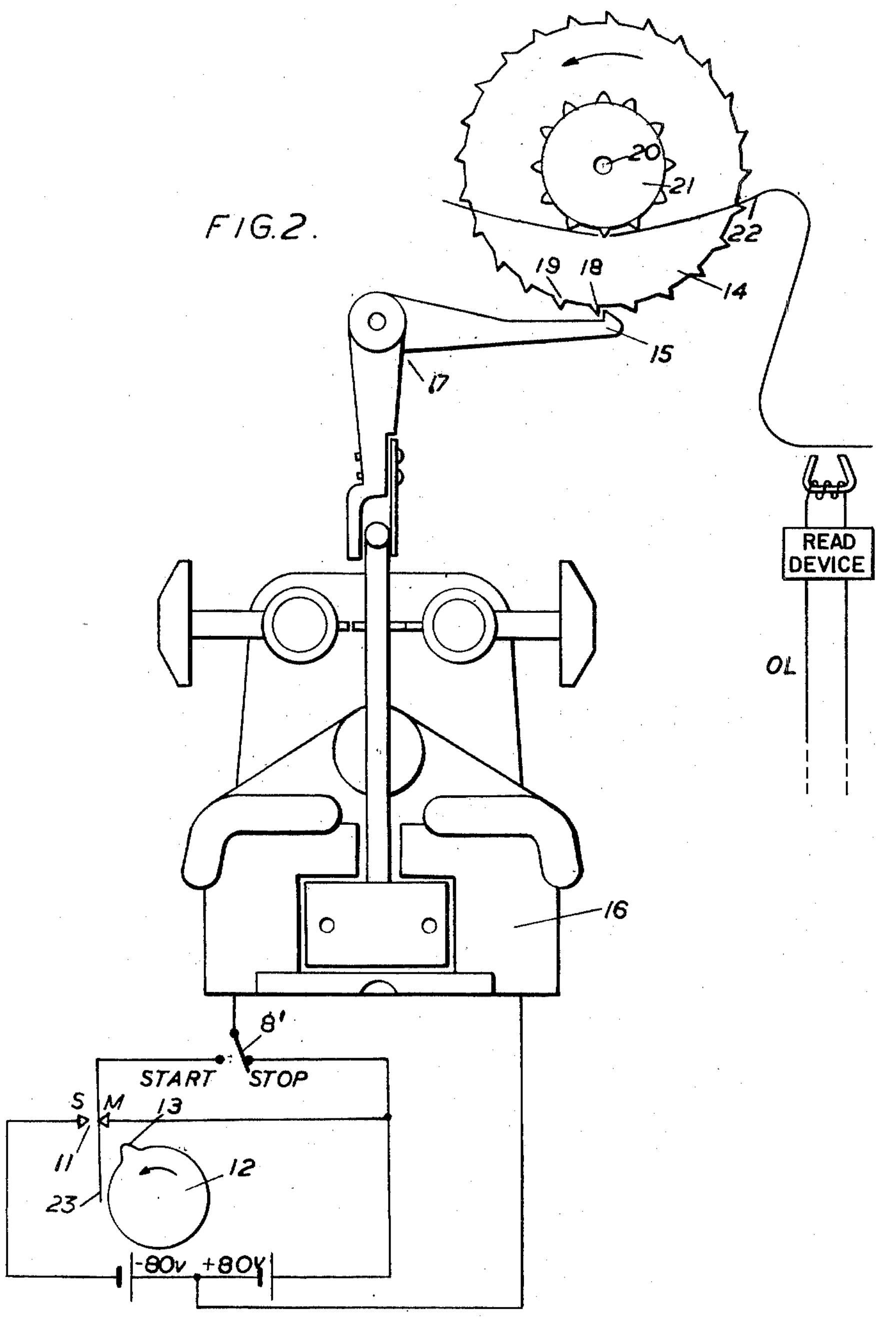

The invention will be described with reference to the accompanying drawings in which:

Fig. 1 shows the apparatus for reducing the length of each character, to the seven units to be recorded, and Fig. 2 shows the apparatus for restoring the character-length upon retransmission.

To avoid cumulative errors due to distortion of received characters the information is recorded in terms of characters occupying a fixed time interval irrespective of the actual length of the received characters, a part of the stop-element of each character usually being discarded in order to record a character of the required length. Upon the receipt of a start-element recording is initiated and continues for a predetermined period of time. At the end of that time, recording ceases and the tape is arrested until the receipt of the start-element of the next character when the process is repeated.

The stored information thus consists of contiguous characters of a standard length. Intervening gaps resulting from manual signalling will have been eliminated together with inaccuracies in character-length. The shortened signal has the additional advantage of being more economical in the use of the available tape.

While the most economic use of the available storage-space would be achieved by dispensing entirely with a stop-element in the recorded characters, a stop-element must be retained of sufficient duration to allow the tape-feed mechanism to be stopped and re-started for the insertion of a rest-period. Thus, a 7½ unit code of which the last 1½ units constitute the stop element, can be cut down to a length equal in time to seven standard units, this being adequate for recording the start-elements, the signal elements, and a significant part of the stop element of a 7½ unit code within normal limits of distortion.

It is also possible to cut down an 8-unit, or an 8½-unit code to the same length, namely 7-units, during recording.

A 7-unit code could be reduced in time, to say 6⅞ standard units during recording, this being adequate to record a significant part of the stop element within the limits of distortion.

In all cases, it is necessary to restore the characters to a desired code on retransmission. This code need not be the same as that which was received, for instance a 7½ unit code could be recorded and could be retransmitted in any one of the other standard codes.

The apparatus to be described was designed to record information in terms of a seven-unit code and is thus capable of receiving any characters exceeding seven-units in length. A stop-element of one unit (twenty milliseconds) duration is thus available, during which periods of, for example, ten, twenty or thirty milliseconds are introduced according as to whether the code to be retransmitted is of 7½, 8 or 8½-units.

Referring to Fig. 1, the incoming characters received over the leads L control the polarised relay 6. The mark and space conditions of the relay are extended as potentials from battery B over the leads R to a known type of flip-flop circuit (not shown) which energises the record-head (not shown).

The relay armature 5 rotates the bell-crank 4 about its pivot 7 causing the detent 2 at the extremity of the arm 3 to move up and down, tracing out the mark-space pattern of the relay in response to the received intelligence elements. Thus when the relay 6 is in its mark condition as shown in the drawing the detent 2 occupies a position between 8 and 9 of the wheel 1. When the relay goes over to space the detent moves outside the periphery of the toothed wheel.

The wheel 1 has twenty-four, equally-spaced teeth and is mounted on the same shaft 40 as the drive sprocket 41 which feds the magnetic tape 42. The shaft 40 is driven from the main shaft of the recording apparatus by means of a slipping clutch (not shown). The shaft completes one rotation in 3.36 secs., which is equal to the time occupied by twenty-four 7-unit code characters. Thus the distance between any two teeth on the wheel 1 represents one character, or a period of 140 milliseconds.

From a position such as that shown in Fig. 1 the shaft 40 rotates together with the wheel 1 until the detent 2 engages the tooth 9. The motion of the wheel 1 is thus arrested, holding the shaft 40, the sprocket 41 and thus the magnetic tape 42 at rest. The slipping clutch already mentioned serves to isolate the shaft 40 from the main drive of the apparatus.

The tape-feed mechanism remains in this rest condition until the receipt of the start-element of a character. The relay 6 then goes over to space releasing the tooth 9. The shaft 40 begins to rotate feeding the magnetic tape 42 to the record head (not shown). Meanwhile the detent 2 is free to perform the mark-space pattern of the relay in response to the received intelligence elements since it is now positioned opposite the arc of the wheel 1 which lies between the successive teeth 9 and 10.

This process continues until 120 milliseconds after the commencement of the start-element which set the tape-feed mechanism in motion. The stop-element of the character is then received, consisting of a mark-element varying in length according to the code being received, but of at least twenty milliseconds duration. The detent 2 is now in its upper position and, 140 milliseconds after the commencement of the character the detent engages the tooth 10 and brings the tape-feed mechanism to rest. A character of seven units in time has now been recorded having a stop-element of one unit. The amount by which the stop-element of the received character exceeded one unit has been discarded.

The mechanism remains in its quiescent state until the receipt of the start-element of a further character. Only then does the tape begin to move again. The recorded information thus consists of contiguous characters of a standard length in time.

Referring to Fig. 2, the mechanism for restoring the character length upon retransmission comprises a toothed wheel 14 exactly similar to the wheel 1 of the recording mechanism already described. The wheel 14 is carried on the same shaft 20 as the sprocket 21 which feeds the magnetic tape 22 to the read head. Like the shaft 40 of Fig. 1 the shaft 20 is driven from the main drive of the apparatus through a slipping clutch. The read head device may include a flip-flop circuit similar to the record head R of Fig. 1, and which flip-flop circuit will control the outgoing line OL.

The teeth of the wheel 14 may be engaged by the detent 15 which is controlled by the relay 16 by means of the bell-crank 17.

With the manually operated key 8' in its "stop" position positive battery is applied to the relay 16, which goes into its mark condition carrying the detent 15 into a position such as that shown in Fig. 2. The wheel 14 rotates until the tooth 18 engages the detent 15. The slipping clutch which provides the drive to the shaft 20 allows the detent 15 to arrest the toothed wheel 14, the shaft 20, the sprocket 21 and thus the tape 22.

Upon throwing the key 8' into the "start" position positive battery is still applied to the control relay 16 over the M contact of the set of change-over contacts 11. The detent 15 thus retains the tape-feed system at rest.

The cam 12 is geared from the main drive of the apparatus so as to complete one revolution in the time occupied by one character in the code to be transmitted. For instance, for restortation to 7½-unit code the cam 12 will be required to complete one revolution in 150 milliseconds.

The tape-feed system remains at rest until the nose 13 of the cam 12 strikes the tongue 23 and operates the change-over contacts 11 causing a momentary connection of the relay to negative battery. During this connection to negative battery the relay goes over to space causing the detent 15 to move downwards for a length of time sufficient to release the tooth 18. The wheel 14 is free to rotate for 140 milliseconds before the detent 15 engages the next tooth 19 thus bringing the tape-feed system to rest once again. Meanwhile the cam 12 continues to rotate for a further ten milliseconds. During this additional ten milliseconds the magnetic tape remains at rest, thus introducing the required half-unit rest period into the signal generated in the read-head. At the end of this additional period, the nose 13 of the cam 12 strikes the tongue 23 again and operates the change-over contacts, thus releasing the tooth 19 of the wheel 14. The tape-feed system is then free to move for a further period of 140 milliseconds before being brought to rest again.

The mark condition inserted in a character as a result of a rest-period must be inserted in the stop-element. An adjustment is therefore provided at the read-head to ensure that when the tape comes to rest the stop-element of a character is positioned beneath the read-head gap. The precise position at which the insertion occurs within that stop-element is unimportant.

It will be appreciated that the function of the cam 12 is merely the production of pulses at appropriate intervals, and that other electrical or mechanical devices could equally be used for the purpose.

While the principles of the invention have been described above in connection with specific embodiments, and particular modifications thereof, it is to be clearly understood that this description is made only by way of example and not as a limitation on the scope of the invention.

What I claim is:

1. A device for selectively altering the time interval between telegraph characters in a telegraph repeater, each character represented by a signal combination consisting of a start element, a plurality of intelligence elements and a stop element comprising means for receiving incoming telegraph signals, means for applying said incoming signals to a record medium, means for advancing said record medium past said signal applying means, said advancing means comprising a wheel having a plurality of stop members equally disposed about the periphery thereof, arresting means coupled to and under control of said receiving means for selectivity co-operating with said stop members, the arc between adjacent stop members being of such a length that said wheel is rotated an angular distance equal to said arc length during the receipt of a start element, intelligence elements and a portion of a stop element, said arresting means adapted to co-operate with a stop member upon the receipt of a portion of a stop element at the conclusion of a received signal combination, said arresting means adapted to release said stop member upon the receipt of the start element of the next succeeding telegraph character, whereby the advance of said recording medium is halted independently of the time interval between such stop and start elements.

2. An apparatus as claimed in claim 1 wherein said record medium comprises magnetic tape.

3. An apparatus as claimed in claim 1 wherein said receiving means comprises an electromagnetic relay and co-operating armature; said means for advancing said record medium comprises a shaft driven at a predetermined speed; and said arresting means for further comprises a slipping clutch mechanism for coupling said wheel to said shaft, a pivoted lever having one of its ends coupled to said armature and its other end adjacent the periphery of said toothed wheel, a battery having its center tap connected to one end of the relay operating coil a tongue connected to the other end of said coil, said tongue being biased towards a contact connected to one pole of said battery to operate said armature to one side to insert the lever between two teeth of said toothed wheel, one of said teeth thereafter engaging said lever to arrest the toothed wheel and the sprocket wheel, a rotating cam for operating said tongue to a further contact connected to the other pole of said battery to operate said armature to its other side thereby disengaging said lever from said tooth and releasing both said toothed wheel and said sprocket wheel, the dimensions and speed of rotation of said cam being adjusted to provide the required stop period.

4. An apparatus as claimed in claim 3 and wherein said cam is driven by the means for driving said shaft.

References Cited in the file of this patent

UNITED STATES PATENTS 2,334,592 Walker ---------------- Nov. 16, 1943